US Patent Number: 4,630,639
Akita et al.
Date of Patent: Dec. 23, 1986

[54] APPARATUS FOR CONTROLLING PRESSURE AND FLOW RATE

[75] Inventors: Yoshisuke Akita; Ichiro Tenmyo; Kiyoshi Hayashi; Kazuyuki Kihara; Akio Mito, all of Tokyo, Japan

[73] Assignee: Tokyo Keiki Co., Ltd., Tokyo, Japan

[21] Appl. No.: 716,377

[22] Filed: Mar. 26, 1985

[30] Foreign Application Priority Data

Mar. 30, 1984 [JP] Japan .................... 59-62811

[51] Int. Cl.$^4$ .................................... F16K 31/36
[52] U.S. Cl. .................................... 137/486; 137/488
[58] Field of Search ............... 137/486, 492, 492.5, 137/489, 488

[56] References Cited

U.S. PATENT DOCUMENTS 2,230,914  2/1941  Sherman ............... 137/486 X
2,291,731  8/1942  Lake .................... 137/486 X
4,476,893 10/1984  Schwelm ................ 137/486

Primary Examiner—Alan Cohan
Attorney, Agent, or Firm—Wenderoth, Lind & Ponack

[57] ABSTRACT

A differential pressure regulator is arranged in series on the inflow side of a variable throttle for adjustment of a flow rate. An inlet pressure of the variable throttle is led into a primary pilot chamber of the differential pressure regulator. A constant flow control valve is provided in an oil passage connecting an oil passage on the inflow side of the differential pressure regulator with a secondary pilot chamber in order to allow a fluid of a constant flow rate to flow. The inflow side of a sequence valve is connected to the side of the secondary pilot chamber of the differential pressure regulator. The outflow side of the sequence valve is connected to the outlet side of the variable throttle or a tank. The inlet passage of the variable throttle is led into the primary pilot chamber of the sequence valve. An outlet pressure of the variable throttle is led into the secondary pilot chamber of the sequence valve. Further a check valve or a throttle is connected in parallel to the sequence valve. A relief valve is provided in an oil passage starting from the outflow side of the constant flow control valve and reaching the tank in order to prevent an increase in peak pressure when a load stops and thereby to control the pressure.

2 Claims, 8 Drawing Figures

APPARATUS FOR CONTROLLING PRESSURE AND FLOW RATE

BACKGROUND OF THE INVENTION

The present invention relates to an apparatus for controlling a pressure and a flow rate in which even when a primary pressure or a secondary pressure to a variable throttle for adjustment of a flow rate varies, a front-to-back differential pressure of the variable throttle is always held to be constant and a constant flow rate which is set depending upon a throttle opening is applied to a load, and at the same time a secondary pressure is also controlled.

Hitherto, in case of controlling both of a flow rate and a pressure, a flow control valve FV and a pressure control valve PV are respectively used as a combination as shown in FIG. 1.

However, the flow control valve FV and pressure control valve PV themselves are large-sized, respectively. In particular, the flow control valve has a drawback such that a flow rate of a fluid passing through the valve changes in the case where there is a variation in front-to-back differential pressure $\Delta P$ of a variable throttle 2; therefore, a differential pressure regulator is combined as will be described later. Thus, an increase in size of the valve itself cannot be avoided.

A variation in flow rate of a fluid which passes through the variable throttle due to the front-to-back differential pressure will be first considered. When it is assumed that a flow rate of the fluid passing through the throttle is Q, a flow coefficient in the throttle portion is c, an area of the opening of the throttle is A, and a density of the fluid is $\rho$, the flow rate Q will be given by the following equation.

$$Q = cA\sqrt{2\Delta P/\rho} \qquad (1)$$

It will be understood from equation (1) that the flow rate Q varies in dependence upon the front-to-back differential pressure $\Delta P$ of the throttle.

Therefore, in the conventional flow control valve FV, on the basis of the principle such that the flow rate does not change when the front-to-back differential pressure $\Delta P$ of the throttle is set to be constnt from the foregoing equation (1), the variable throttle 2 and a differential pressure regulator 4 are combined and the front-to-back differential pressure of the throttle is made constant even if there is a variation in pressure before and after the throttle, thereby keeping the flow rate of the fluid which passes through the valve to become a set flow rate.

Practically speaking, in the flow control valve FV in FIG. 1, the differential pressure regulator 4 is connected in series to an oil passage on the side of the inlet of the variable throttle 2, an inlet pressure $P_1$ of the variable throttle 2 is led into a primary pilot chamber of the differential pressure regulator 4, and an outlet pressure $P_2$ of the variable throttle 2 is led into a secondary pilot chamber equipped with a differential pressure setting spring.

A further detailed explanation will be made with reference to a structure of the valve in FIG. 2. A pressure compensating spool 8 is slidably arranged in the passage from the inlet to the outlet of a body 6. A pressure compensating orifice 10 is formed between the land on the right side of the spool 8 and the inlet passage. A primary pilot chamber 14 into which the inlet pressure $P_1$ of the variable throttle 2 is led is formed on the right side of the spool 8, while a piston 16 of a large diameter is integrally formed on the left side. The inlet pressure $P_1$ is led onto the right side of the piston 16 of a large diameter. Also, a differential pressure setting spring 20 is provided in a secondary pilot chamber 18 on the left side of the piston 16. The outlet pressure $P_2$ of the variable throttle 2 is led into the secondary pilot chamber 18.

For the operation of the flow control valve FV shown in FIGS. 1 and 2, the fluid enters from the inlet and passes through the pressure compensating orifice 10 and variable throttle 2 and reaches the outlet. In this case, the inlet pressure $P_1$ of the variable throttle 2 acts on area portions $A_1$, $A_2$ and $A_3$ of the pressure compensating spool 8 through a small hole and the outlet pressure $P_2$ acts on the area portion $A_1$. Therefore, when considering the balance of the forces which act on the pressure compensating spool 8 in the stationary state whereby the fluid is flowing, $$F + A_1 \times P_2 = (A_2 + A_3) \times P_1$$

(where, F is a compression force of the differential pressure setting spring 20).

Since $A_1 = A_2 + A_3$, we have $$P_1 - P_2 = F/A_1 \qquad (2)$$

Thus, it will be understood from equation (2) that the front-to-back differential pressure $(P_1 - P_2)$ of the variable throttle 2 becomes constant.

Practically speaking, when an inlet pressure $P_0$ varies, an inflow amount from the pressure compensating orifice 10 changes in dependence upon the pressure $P_0$ and the front-to-back differential pressure of the variable throttle 2 also changes, so that the forces which act on the pressure compensating spool 8 become unbalanced. Namely, when the inlet pressure $P_0$ increases, the pressure compensating spool 8 is moved to the balanced position on the left side. On the contrary, when the inlet pressure $P_0$ decreases, the pressure compensating spool 8 is moved to the balanced position on the right side.

On one hand, in the case where the outlet pressure $P_2$ changes as well, the forces which act on the pressure compensating spool 8 become unbalanced, so that the spool 8 is moved to the balanced position on the left side with a decrease in outlet pressure $P_2$, while the spool 8 is moved to the balanced position on the right side with an increase in outlet pressure $P_2$.

Thus, due to the operation of the pressure compensating spool 8, the differential pressure regulator 4 functions such that $F/A_1$ in the foregoing equation (2) becomes constant, thereby making the passing flow rate of the variable throttle 2 constant.

However, in such a conventional flow control circuit, the flow rate and pressure of the pressure compensating orifice 10 of the differential pressure regulator 4 also change in dependence upon the pressure and flow rate of the fluid flowing through the variable throttle 2. These changes influence the balance based on the differential pressure setting spring 20 of the pressure compensating spool 8, so that the front-to-back differential pressure of the variable throttle 2 does not become a stable constant value.

To solve such a problem, there is considered a method whereby the hydraulic acting areas $A_1$, $A_2$ and $A_3$ of the pressure compensating spool 8 are enlarged and a spring force of the differential pressure setting spring 20 is also made large. However, there are the following problems. Namely, even if the use flow rate (operating flow rate of the fluid which is practically applied) is the same, the control valve increases in size. The response speed also deteriorates in association with an increase in size of the spool. Further, when the differential pressure setting spring is made strong, the lowest working pressure upon operation of the differential pressure regulator increases.

On the other hand, the reduction in response speed can be solved by enlarging the area of the passage of the pilot passage; however, this obviously causes a problem such that the valve is increased in size.

SUMMARY OF THE INVENTION

It is an object of the present invention to provide a flow control apparatus in which a front-to-back differential pressure of a variable throttle can be always be maintained constant within a range of the rated flow rate without increasing the sizes of a pressure compensating spool and a differential pressure setting spring of a differential pressure regulator.

Another object of the invention is to provide a flow control apparatus in which the rated flow rate can be properly set without depending upon the strength of the differential pressure setting spring of the differential pressure regulator.

Further another object of the invention is to provide a flow control apparatus in which a specified pressure can be settled by a rapid pressure control upon setting of the peak pressure or the like when a load stops.

The above and other objects, features and advantages of the invention will become apparent from the following description taken in connection with the accompanying drawings.

DESCRIPTION OF THE PREFERRED EMBODIMENTS

Figure 3:
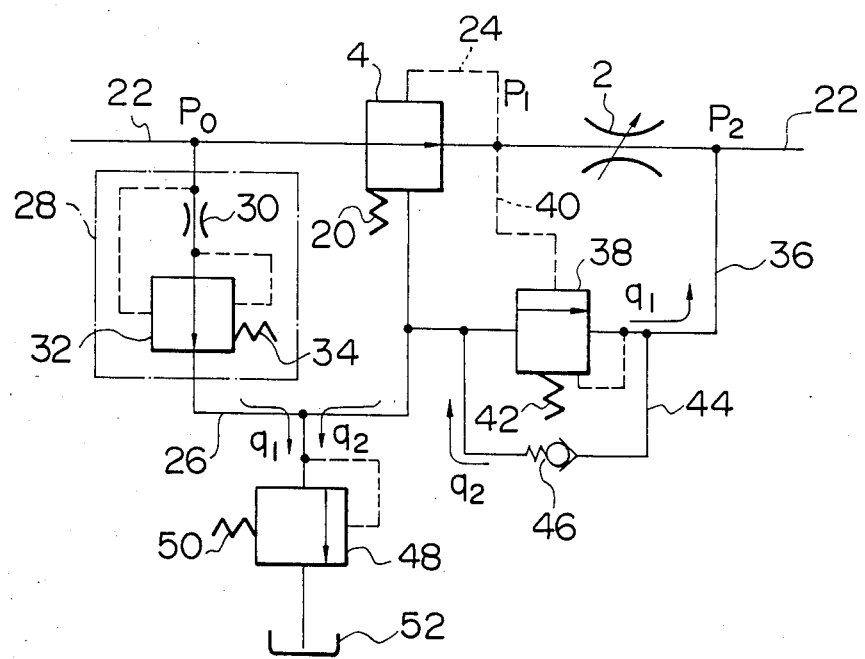
FIG. 3 is a circuit diagram showing one embodiment of the present invention.
Figure 4:
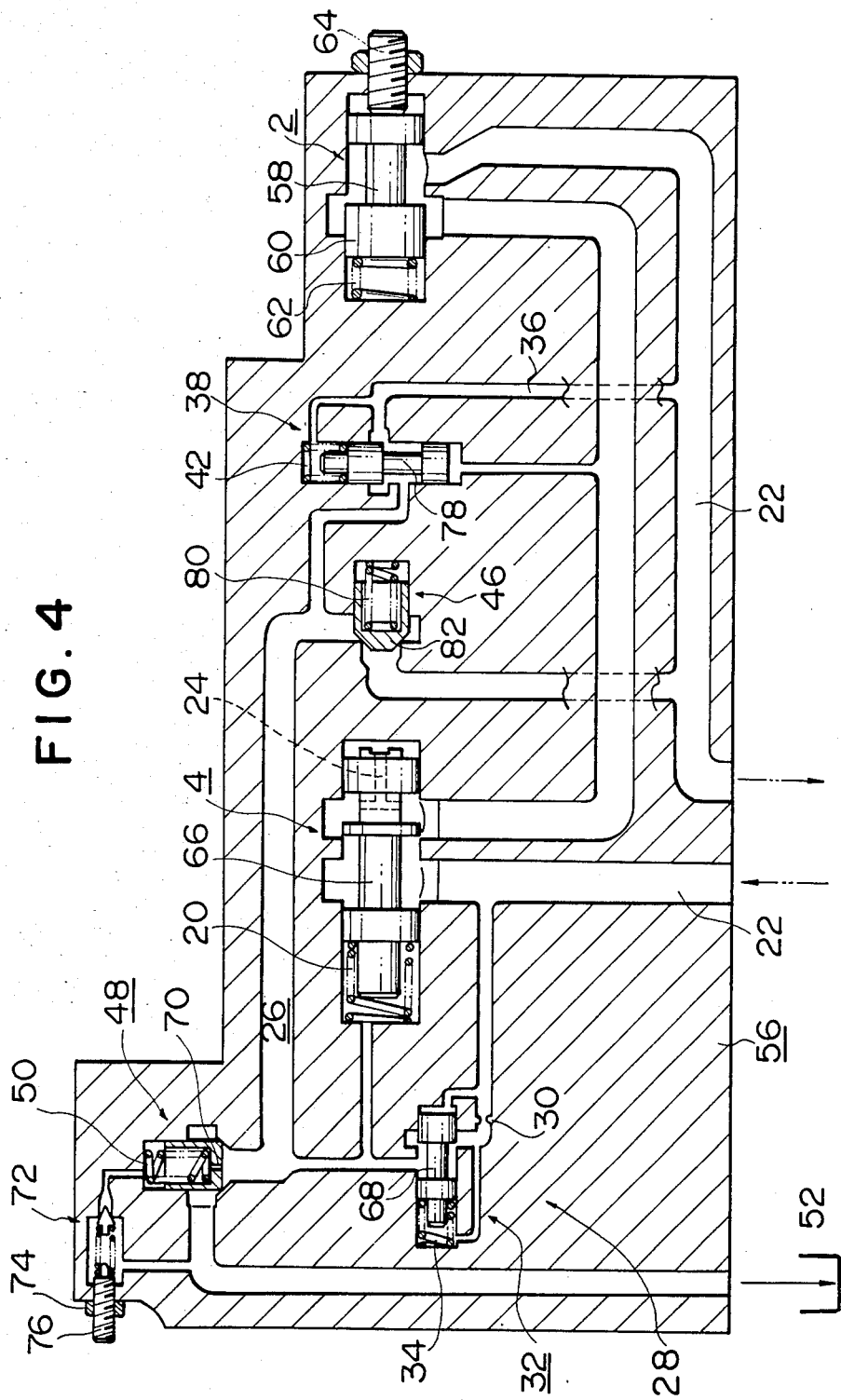
FIG. 4 is a cross sectional view showing a structure of a practical apparatus for controlling a pressure and a flow rate corresponding to the circuit diagram shown in FIG. 3.

One embodiment of the present invention will now be described with reference to FIGS. 3 and 4. FIG. 3 is a hydraulic circuit diagram. FIG. 4 is a cross sectional view showing a practical structure corresponding to this hydraulic circuit diagram.

Figure 1:
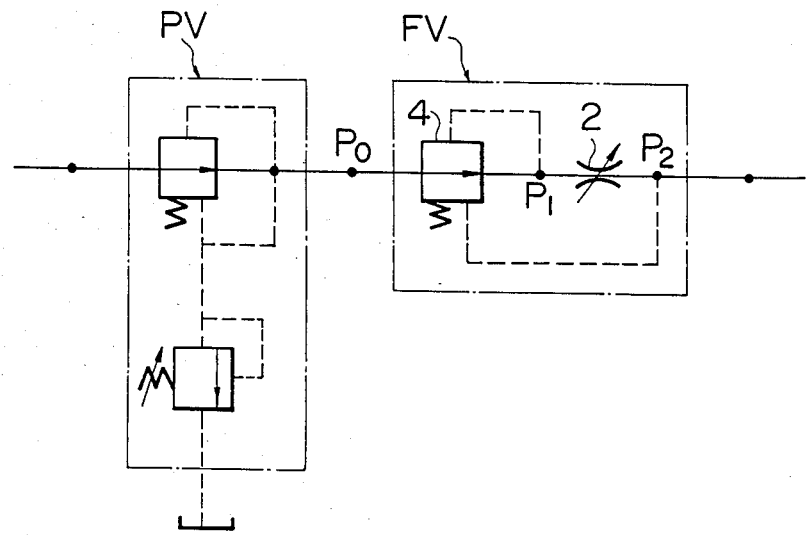
FIG. 1 is a circuit diagram showing a conventional circuit.
Figure 2:
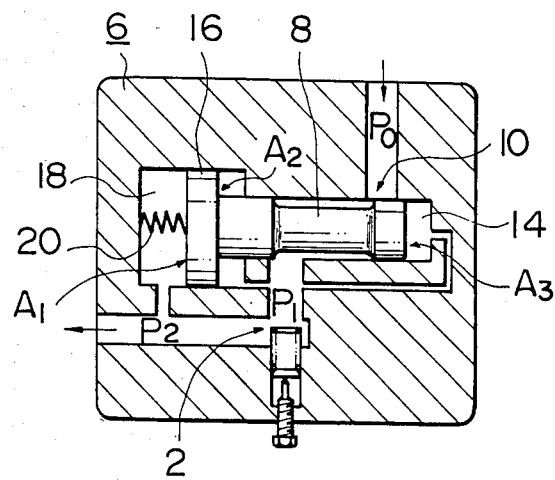
FIG. 2 is a cross sectional view showing an example of a structure of a conventional valve.

A circuit arrangement will be first explained with reference to FIG. 3. The variable throttle 2 for adjustment of a flow rate is provided in a main oil passage 22 which is connected from a hydraulic source to a load such as a cylinder or the like. The differential pressure regulator 4 is arranged in series on the input side of the variable throttle 2. The inlet pressure $P_1$ of the variable throttle 2 is led through a pilot oil passage 24 into the primary pilot chamber of the differential pressure regulator 4. The differential pressure setting spring 20 is built in the secondary pilot chamber of the regulator 4. The circuit section consisting of the variable throttle 2 and differential pressure regulator 4 has the same arrangement as that of the conventional flow control valve FV shown in FIGS. 1 and 2.

In addition to this arrangement, in the present invention, a constant flow control valve 28 is provided in an oil passage 26 for connecting the main oil passage 22 to the secondary pilot chamber of the differential pressure regulator 4, thereby allowing a fluid of a constant small pilot flow rate $q_1$ to flow by means of the constant flow control valve 28. The constant flow control valve 28 has a structure in which a fixed throttle 30 to determine a flow rate and a differential pressure regulator (i.e., fixed differential reducing valve) 32 are arranged in series. The differential pressure regulator 32 introduces the front-to-back pressure of the fixed throttle 30 as the pilot pressure and operates so as to keep the front-to-back differential pressure of the fixed throttle 30 constant in cooperation with a differential pressure setting spring 34. The control to hold the front-to-back differential pressure constant due to the fixed throttle 30 and differential pressure regulator 32 constituting the constant flow control valve 28 is attained due to the same function as that of the conventional flow control valve FV shown in FIGS. 1 and 2.

On the other hand, a sequence valve 38 is provided in an oil passage 36 for connecting the secondary pilot chamber of the differential pressure regulator 4 with the main oil passage 22 on the outflow side of the variable throttle 2. The inlet pressure $P_1$ of the variable throttle 2 is led into the primary pilot chamber of the sequence valve 38 through a pilot oil passage 40. On one hand, the outlet pressure $P_2$ of the variable throttle 2 is led into the secondary pilot chamber equipped with a differential pressure setting spring 42. The front-to-back differential pressure of the variable throttle 2 is applied as the pilot pressure to throttle the sequence valve 38. Further, a check valve 46 is connected through a bypass oil passage 44 in parallel to the sequence valve 38 in the direction opposite to the flowing direction.

A spring load $F_0$ of the setting spring 20 in the differential pressure regulator 4 is set to be equal to or slightly smaller than that in the conventional apparatus. Therefore, as the pressure compensating spool for use in the differential pressure regulator 4, a spool whose size is equal to or smaller than the conventional spool is used.

On the other hand, a spring load $F_1$ of the differential pressure setting spring 42 of the sequence valve 38 is determined in accordance with the rated flow rate (maximum flow rate) of the variable throttle 2. In case of increasing the rated flow rate, the differential pressure setting spring 42 having a large enough spring load $F_1$ is used.

Further, a cracking pressure due to the setting spring provided in the check valve 46 is set to be equal to or more than the differential pressure in the differential pressure regulator 4.

In addition, a relief valve 48 is provided in the oil passage for connecting the oil passage 26 with a tank 52. A predetermined relief pressure is set by a relief pressure setting spring 50. This relief valve 48 serves to suppress the generation of the peak pressure when a load stops as will be explained later and to control the pressure.

FIG. 4 is a cross sectional view showing a practical structure of an apparatus for controlling a pressure and a flow rate corresponding to the circuit diagram of FIG. 3 and its structure will be described in correspondence to FIG. 3.

The variable throttle 2 and differential pressure regulator 4 are formed in series in the main oil passage 22 formed in a body 56. A spool 58 arranged slidably in the variable throttle 2 and a setting spring 62 to elastically press a land 60 on the left side coupled with the spool 58 are built in the body 56. The opening of the spool 58 is adjusted by means of an adjusting screw 64 which abuts on a land on the right side.

In the differential pressure regulator 4, a land on the left side of a spool 66 is elastically pressed by means of the setting spring 20 built in the secondary pilot chamber, and the primary pilot chamber and the oil passage on the outlet side are communicated through the pilot oil passage 24 formed on the side of a land on the right side.

The differential pressure regulator 32 and fixed throttle 30 of the constant flow control valve 28 are provided in series in the oil passage between the oil passage on the inlet side and the secondary pilot chamber of the differential pressure regulator 4. The differential pressure setting spring 34 to elastically press a land on the left side of a spool 68 is built in the secondary pilot chamber of the differential pressure regulator 32.

The oil passage 26 which connects the secondary pilot chamber of the differential pressure regulator 4 and the oil passage on the outflow side of the differential pressure regulator 32 is communicated with the oil passage from the tank 52 through the relief valve 48. The differential pressure setting spring 50 is built in the secondary pilot chamber of the relief valve 48. The oil passage 26 and the secondary pilot chamber are communicated through a small hole 70.

A pressure adjusting mechanism 72 is provided between the secondary pilot chamber of the relief valve and the oil passage on the side of the tank 52. The pressure is adjusted by means of a pressure adjusting bolt 76 engaged with a locknut 74.

Further, the oil passage 26 is communicated with the oil passage 36 through the sequence valve 38 and is also communicated with the outlet side of the main oil passage 22 through the check valve 46. The sequence valve 38 has a spool 78 and the differential pressure setting spring 42 to elastically press this spool. The check valve 46 has a setting spring 80 to set a predetermined cracking pressure and a poppet 82 which is elastically pressed to the setting spring 80.

Next, the operation of the embodiment in FIGS. 3 and 4 will be described.

Assuming that an amount of oil which is supplied to the load increases when the oil is flowing into the main oil passage 22 in the state whereby the variable throttle 2 was opened to a degree such as to derive a set flow rate, the front-to-back differential pressure of the variable throttle 2 also increases. The front-to-back differential pressure $\Delta P$ of this variable throttle 2 is applied as the pilot pressure to the sequence valve 38. When the force which is developed due to the differential pressure $\Delta P$ reaches the spring force $F_1$ of the differential pressure setting spring 42, the sequence valve 38 is switched to open the oil passage, thereby allowing the constant flow rate $q_1$ from the constant flow control valve 28 to flow through the sequence valve 38 to the side of the load. Thus, the pressure of the secondary pilot chamber of the differential pressure regulator 4 decreases, thereby causing the pressure compensating spool of the differential pressure regulator 4 to be moved in the direction so as to close the pressure compensating orifice until the pressure is balanced. Due to this, the flow rate of the fluid flowing through the variable throttle 2 is suppressed and the front-to-back differential pressure $\Delta P$ is held to a constant value corresponding to the set flow rate. By always keeping the front-to-back differential pressure $\Delta P$ of the variable throttle 2 constant, the fluid of a constant flow rate which was set by the variable throttle 2 can be supplied to the cylinder load.

On one hand, since the secondary pilot pressure of the differential pressure regulator 4 is controlled by the sequence valve 38 provided independently of the main oil passage 22, the pilot pressure is not influenced due to a change in opening of the pressure compensating orifice of the differential pressure regulator 4. Thus, there is no need to eliminate the influence to the pilot pressure due to the change of the opening by making the differential pressure setting spring 20 strong or increasing the hydraulic acting area of the pressure compensating spool. As the differential pressure regulator 4, a regulator which is equal to or further smaller than the conventional regulator can be used.

Further, the setting of the rated flow rate corresponding to the maximum flow rate at which the front-to-back differential pressure $\Delta P$ of the variable throttle 2 can be controlled to become constant is performed by merely increasing the spring load $F_1$ of the differential pressure setting spring 42 in the sequence valve 38 without using the differential pressure setting spring 20 of the differential pressure regulator 4. The fluid of the small flow rate $q_1$ due to the constant flow control valve 28 is merely allowed to flow through the oil passage 36 in which the sequence valve 38 is provided. Therefore, even if the spring load $F_1$ of the differential pressure setting spring 42 is enlarged, there is no need to enlarge the valve structure and even if the rated flow rate is increased, the control circuit can be designed to become small-sized.

Moreover, as the differential pressure setting spring 20 of the differential pressure regulator 4, a spring of a small spring load $F_0$ can be used, so that the apparatus can be miniaturized.

The pressure control in the embodiment shown in FIGS. 3 and 4 will then be described.

When the fluid of the constant flow rate which was set through the differential pressure regulator 4 and variable throttle 2 is supplied to the load cylinder and the flow rate of the fluid to be supplied to the load becomes zero when it reaches the end of the cylinder, the pressure in the circuit increases toward the discharge pressure of the hydraulic source. Thus, the pressure of the oil passage 26 also increases and when it reaches the relief set pressure due to the relief pressure setting spring 50, the relief valve 48 is opened, so that the oil passage 26 is communicated with the tank 52. Consequently, the pressure which is applied to the secondary pilot chamber of the differential pressure regulator 4 is maintained to be the relief set pressure due to the relief valve 48. On one hand, the peak pressure on the load side due to the inflow into the load due to a time lag of the response of the differential pressure regulator 4 is applied to the primary pilot chamber. Thus, the differential pressure regulator 4 is closed. At the same time, the relief valve 48 is opened and the outlet peak pressure $P_2$ caused because of the stop of the load is drawn out into the tank 52 through the check valve 46 and relief valve 48, thereby suppressing the increase of the peak pressure when the load stops.

In other words, the pressure can be allowed to escape into the tank 52 by opening the check valve 46 upon generation of the peak pressure and the peak pressure can be suppressed to be a relatively small value. In addition, it is possible to derive a high response speed in the pressure control in which the settling time until the pressure is settled to the constant pressure is short.

The cracking pressure of the check valve 46 is nearly equal to or more than the differential pressure of the differential pressure regulator 4, so that the check valve 46 is closed in the stationary state.

Figure 5:
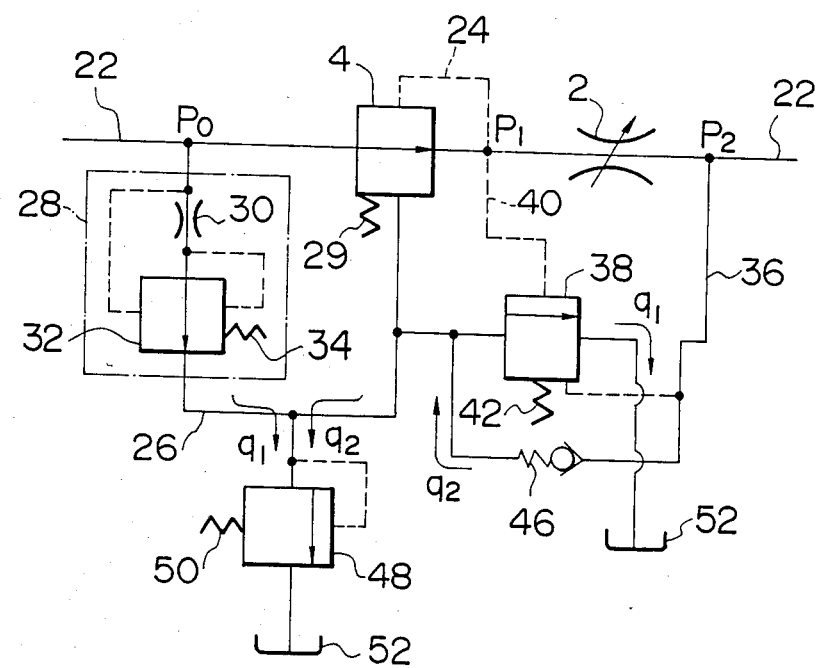
FIG. 5 is a circuit diagram showing another embodiment of the invention.
Figure 6:
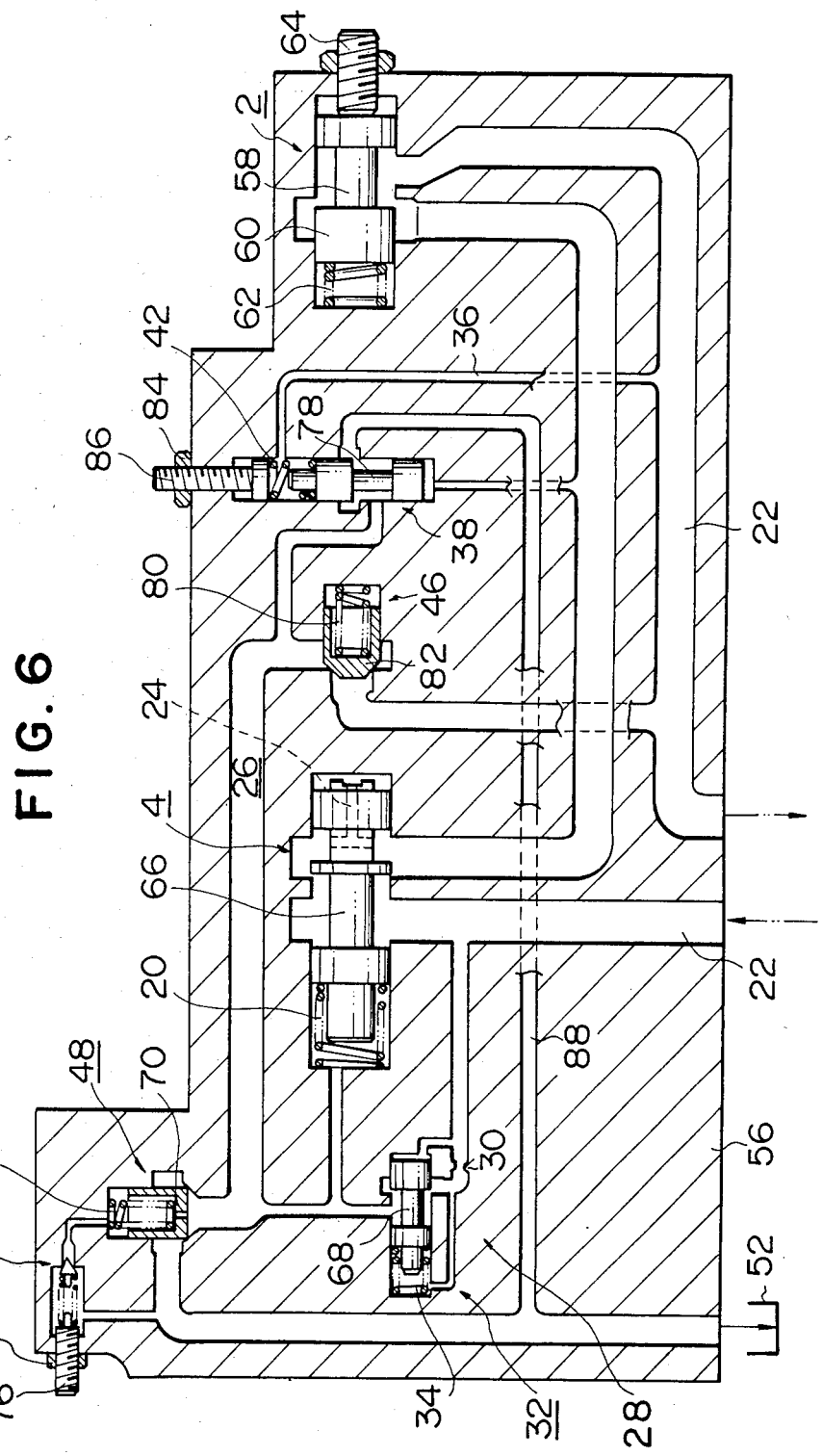
FIG. 6 is a cross sectional view showing a structure of a practical apparatus for controlling a pressure and a flow rate corresponding to the circuit diagram shown in FIG. 5.

FIG. 5 is a circuit diagram showing another embodiment of the present invention. FIG. 6 is a cross sectional view showing a practical structure of an apparatus for controlling a pressure and a flow rate corresponding to the circuit diagram of FIG. 5.

In this embodiment, it is a main feature that the outlet side of the sequence valve 38 is connected to the tank 52. In this circuit, the same parts and components as those shown in FIGS. 3 and 4 are designated by the same reference numerals and their descriptions are omitted.

Another feature of this embodiment is that a supply amount to the load is set to zero when the opening of the variable throttle 2 is zero. Practically speaking, in the embodiment shown in FIGS. 3 and 4, even when the opening of the variable throttle 2 is completely set to zero, the fluid of the constant flow rate $q_1$ due to the constant flow control valve 28 passes through the sequence valve 38 and flows into the load side, so that the supply flow rate cannot be suppressed to zero. On the other hand, in the embodiment of FIGS. 5 and 6, the outlet of the sequence valve 38 is connected to the tank 52, so that when the variable throttle 2 is closed to become the zero flow rate, the sequence valve 38 is opened and the fluid of the constant flow rate $q_1$ from the constant flow control valve 28 flows into the tank 52 but is not sent to the outlet side of the variable throttle 2. Thus, the supply flow rate into the load can be completely restricted to the zero flow rate. In this way, the control of the flow rate from the zero flow rate can be performed by the variable throttle 2.

In the embodiment of FIGS. 5 and 6, the spring pressure of the sequence valve 38 is adjusted by an adjusting screw 86 engaged with a locknut 84 as shown in FIG. 6. The oil passage on the outlet side of the sequence valve 38 is communicated with an oil passage 88 connected to the tank 52.

On one hand, the flow control when the fluid of a predetermined flow rate is allowed to flow through the main oil passage 22 by opening the variable throttle 2 is performed as the balance control in a manner as follows. Namely, since the supply of the pilot pressure to the sequence valve 38 is the same as that in FIG. 3, the oil passage 26 is connected to the tank 52 by opening the sequence valve 38 due to an increase in differential pressure $\Delta P$ of the variable throttle 2 and thereby allowing the fluid of the flow rate $q_1$ to flow, so that the secondary pilot pressure of the differential pressure regulator 4 is reduced and thereby keeping the front-to-back differential pressure of the variable throttle 2 to be the constant differential pressure in accordance with the set opening.

Further, with respect to the peak pressure as well upon stopping of the load, the peak pressure is allowed to escape from the check valve 46 into the tank 52 through the relief valve 48. Therefore, the generation of the peak pressure when the load stops can be suppressed and the settling time until the pressure is settled to the specified pressure can also be made short.

Figure 7:
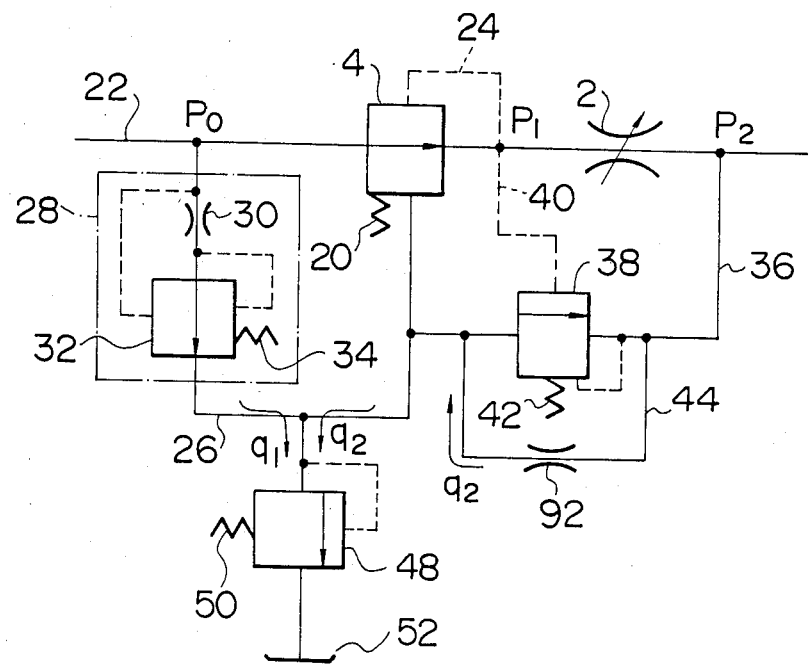
FIG. 7 is a circuit diagram showing further another embodiment of the invention.

FIG. 7 is a circuit diagram showing further another embodiment of the invention. A feature of this embodiment is that a throttle 92 is provided in parallel to the sequence valve 38 in place of the check valve 46 in FIG. 3. In this circuit, the similar parts and components as those shown in the embodiment of FIG. 3 are designated by the same reference numerals and their descriptions are omitted.

Assuming that the front-to-back differential pressure $\Delta P(=P_1-P_2)$ of the variable throttle 2 decreases due to, for instance, a variation in inlet pressure $P_0$ or outlet pressure $P_2$ when the fluid is flowing through the main oil passage 22 in the state whereby the variable throttle 2 was opened to a degree such as to derive the set flow rate, the sequence valve 38 is closed as shown in the diagram when the force which is applied to the sequence valve 38 due to the front-to-back differential pressure $\Delta P$ becomes a value below the spring force $F_1$ of the differential pressure setting spring 42. Thus, the fluid of the constant flow rate $q_1$ due to the constant flow control valve 28 flows through the throttle 92 provided in the bypass oil passage 44. The pressure to the secondary pilot chamber of the differential pressure regulator 4 increases due to the differential pressure developed by the throttle 92 due to the fluid of this constant flow rate $q_1$. The pressure compensating spool of the differential pressure regulator 4 is moved in the direction such as to open the pressure compensating orifice until the pressure is balanced. Consequently, the flow rate of the fluid flowing through the variable throttle 2 is increased, causing the front-to-back differential pressure $\Delta P$ to be recovered to the constant value corresponding to the set flow rate.

Next, it is assumed that the front-to-back differential pressure $\Delta P(=P_1-P_2)$ of the variable throttle 2 increases due to an increase in inlet pressure $P_0$ or decrease in outlet pressure $P_2$. In this case, when the force which acts on the sequence valve 38 depending upon the front-to-back differential pressure $\Delta P$ exceeds the spring force $F_1$ of the differential pressure setting spring 42, the sequence valve 38 is changed over to open the oil passage, thereby allowing the fluid of the constant flow rate $q_1$ due to the constant flow control valve 28 to flow through the sequence valve 38. Thus, the pressure in the secondary pilot chamber of the differential pressure regulator 4 decreases, causing the pressure compensating spool in the differential pressure regulator 4 to be moved in the direction such as to close the pressure compensating orifice until the pressure is balanced. Due to this, the flow rate of the fluid flowing through the variable throttle 2 is suppressed and the front-to-back differential pressure $\Delta P$ is suppressed to the constant value corresponding to the set flow rate.

Due to the control of the secondary pilot pressure of the differential pressure regulator 4 due to the action of the sequence valve 38 responsive to the front-to-back differential pressure ΔP of the variable throttle 2 as mentioned above, the front-to-back differential pressure ΔP of the variable throttle 2 is always maintained to be constant. Even if the inlet pressure $P_0$ or outlet pressure $P_2$ varies, the fluid of the constant flow rate set by the variable throttle 2 can be supplied to the cylinder load or the like.

On one hand, the secondary pilot pressure of the differential pressure regulator 4 is controlled by the sequence valve 38 provided independently of the main oil passage 22, so that the pilot pressure is not influenced by the change of the opening of the pressure compensating orifice of the differential pressure regulator 4. Therefore, there is no need to make the differential pressure setting spring 20 strong or to enlarge the hydraulic acting area of the pressure compensating spool. As the differential pressure regulator 4, a regulator which is equal to or further smaller than the conventional regulator can be used.

Further, the setting of the rated flow rate corresponding to the maximum flow rate which can control the front-to-back differential pressure ΔP of the variable throttle 2 to be constant can be realized by increasing the spring load $F_1$ of the differential pressure setting spring 42 in the sequence valve 38 without depending upon the differential pressure setting spring 20 of the differential pressure regulator 4. The fluid of the small flow rate $q_1$ which is restricted by the constant flow control valve 28 may be merely allowed to flow through the oil passage 36 in which the sequence valve 38 is arranged. Thus, the sequence valve 38 itself can be miniaturized and even if the spring load $F_1$ of the differential pressure setting spring 42 is enlarged, there is no need to make the valve structure large. Also, even if the rated flow rate is increased, the control circuit can be designed so as to become small-sized.

The above-mentioned point can be also likewise applied to the constant flow control valve 28 provided in the oil passage 26 and the throttle 92 connected in parallel to the sequence valve 38. The fluid of the small flow rate $q_1$ due to the constant flow control valve 28 is merely allowed to flow. Therefore, for the constant flow control valve 28 and throttle 92, a small-sized valve and throttle can be used. Thus, even in the case where the constant flow control valve 28, sequence valve 38 and throttle 92 are newly arranged, the control circuit can be sufficiently miniaturized.

The pressure control in the embodiment of FIG. 7 will then be explained. In this embodiment, the fluid of the constant flow rate which was set through the differential pressure regulator 4 and variable throttle 2 is supplied to the load cylinder and when it reaches the end of the cylinder, the flow rate becomes zero. At the same time, the pressure in the circuit increases toward the discharge pressure of the hydraulic source. For this increase of the pressure, when the pressure reaches the relief set pressure which is determined by the relief pressure setting spring 50, the relief valve 48 is opened to be communicated with the tank 52, so that the differential pressure regulator is rapidly closed, thereby allowing the pressure in the circuit to be suppressed to the relief set pressure. Upon pressure control in the stationary state, the fluid of the constant small flow rate $q_1$ due to the constant flow control valve 28 and a small flow rate $q_2$ due to the leakage of the differential pressure regulator 4 and variable throttle 2 flows through the throttle 92 into the relief valve 48. In this case, the differential pressure between the primary pilot pressure and secondary pilot pressure in the differential pressure regulator 4 is the relatively low differential pressure which is determined by the differential pressure setting spring 20. This differential pressure is independent of the set pressure due to the differential pressure setting spring 42 of the sequence valve 38.

As mentioned in this embodiment, when the pressure is controlled using the throttle 92, the settling time from the time when the peak pressure on the load side is generated until the pressure is settled to the constant pressure which is determined by the relief pressure that is set by the relief valve 48 becomes slightly longer than that in the case where the check valve 46 shown in FIGS. 3 to 6 is used. However, no practical problem is caused. Therefore, the structure can be simplified and miniaturized.

Figure 8:
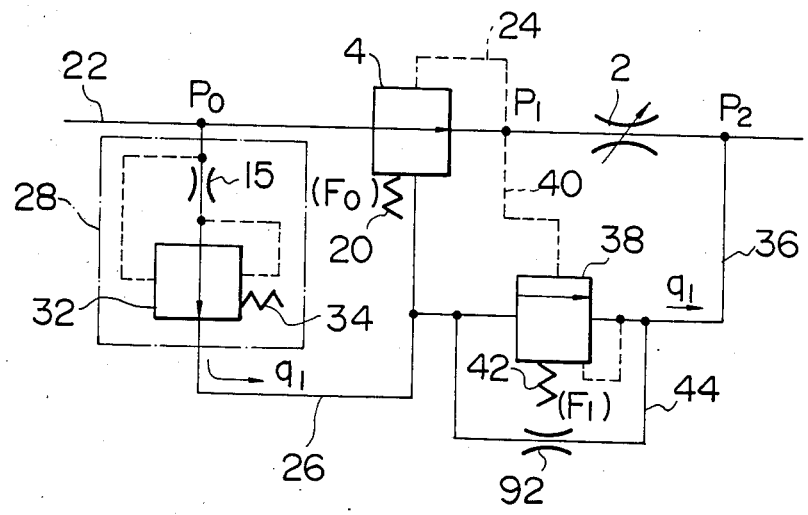
FIG. 8 is a circuit diagram showing still another embodiment of the invention.

FIG. 8 is a circuit diagram showing still another embodiment of the present invention.

This embodiment relates to a circuit only for control of a flow rate in which the relief valve 48 in FIG. 7 is removed. In this circuit, the same parts and components as those shown in the embodiment of FIG. 6 are designated by the same reference numerals and an explanation will be made.

An arrangement of FIG. 8 will be first described. The variable throttle 2 for adjustment of a flow rate is provided in the main oil passage 22 which is connected between the hydraulic source and a load such as a cylinder or the like. The differential pressure regulator 4 is arranged in series on the inflow side of the variable throttle 2. The inlet pressure $P_1$ of the variable throttle 2 is led through the pilot oil passage 24 into the primary pilot chamber of the differential pressure regulator 4. The differential pressure setting spring 20 is provided in the secondary pilot chamber of the regulator 4. The circuit section consisting of the variable throttle 2 and differential pressure regulator 4 has the same arrangement as the conventional flow control circuit shown in FIGS. 1 and 2.

In addition to the foregoing arrangement, in this embodiment, the constant flow control valve 28 to allow the fluid of a constant small pilot flow rate to flow is provided in the oil passage 26 which connects the inflow side of the differential pressure regulator 4 and the secondary pilot chamber. The constant flow control valve 28 has a structure in which the fixed throttle 30 and differential pressure regulator 32 to determine a flow rate are arranged in series. The differential pressure regulator 32 acts so as to keep the front-to-back differential pressure of the fixed throttle 30 constant on the basis of the front-to-back differential pressure of the fixed throttle 30 and the differential pressure setting spring 36. The above-mentioned control to keep the front-to-back differential pressure constant due to the fixed throttle 30 and differential pressure regulator 32 constituting the constant flow control valve 28 equivalently corresponds to the function of the conventional flow control circuit shown in FIGS. 1 and 2.

On the other hand, the sequence valve 38 is provided in the oil passage 36 connecting the secondary pilot chamber of the differential pressure regulator 4 with the main oil passage 22 on the outflow side of the variable throttle 2. The inlet pressure $P_1$ of the variable throttle 2 is led through the pilot oil passage 40 into the primary pilot chamber of the sequence valve 38. The outlet pressure $P_2$ of the variable throttle 2 is led into the secondary pilot chamber having the differential pressure setting spring 42. Further, the throttle 92 is connected in parallel to the sequence valve 38 through the bypass oil passage 44.

The spring load $F_0$ of the differential pressure setting spring 20 in the differential pressure regulator 4 is set to be equal to or relatively smaller than that of the conventional apparatus. Therefore, as the pressure compensating spool for use in the differential pressure regulator 4 as well, a spool which is equal to or smaller than the conventional spool may be used. In addition, as the differential pressure setting spring 42 of the sequence valve 38, a spring having a spring is used load $F_1$ which is determined in accordance with the rated flow rate of the variable throttle 2 and which is sufficiently large in case of increasing the rated flow rate.

The operation of the embodiment of FIG. 8 will then be described.

It is now assumed that the front-to-back differential pressure $\Delta P(=P_1-P_2)$ of the variable throttle 2 decreases due to, for example, a variation in inlet pressure $P_0$ or outlet pressure $P_2$ when the fluid is flowing through the main oil passage 22 in the state whereby the variable throttle 2 was opened to a degree so as to derive the set flow rate. In this case, when the force which is applied to the sequence valve 38 due to the front-to-back differential pressure $\Delta P$ becomes a value below the spring force $F_1$ of the differential pressure setting spring 42, the sequence valve 38 is closed as shown in the diagram, so that the fluid of the constant flow rate $q_1$ due to the constant flow control valve 28 flows through the throttle 92 provided in the bypass oil passage 44. The pressure to the secondary pilot chamber of the differential pressure regulator 4 is increased due to the differential pressure which is developed in the throttle 92 on the basis of the constant flow rate $q_1$. The pressure compensating spool of the differential pressure regulator 4 is moved in the direction so as to open the pressure compensating orifice until the pressure is balanced. Thus, this causes the flow rate of the fluid flowing through the variable throttle 2 to be increased, thereby allowing the front-to-back differential pressure $\Delta P$ to be recovered to the constant value corresponding to the set flow rate. The throttle 92 is not necessarily used. In this case, the fluid may be allowed to pass through only the sequence valve 38.

Next, it is assumed that the front-to-back differential pressure $\Delta P(=P_1-P_2)$ of the variable throttle 2 increases due to an increase in inlet pressure $P_0$ or decrease in outlet pressure $P_2$. In this case, when the force acting on the sequence valve 38 in response to the front-to-back differential pressure $\Delta P$ exceeds the spring force $F_1$ of the differential pressure setting spring 42, the sequence valve 38 is changed over to open the oil passage, thereby allowing the fluid of the constant flow rate $q_1$ from the constant flow control valve 28 to flow through the sequence valve 38. Thus, the pressure in the secondary pilot chamber of the differential pressure regulator 4 decreases, causing the pressure compensating spool in the differential pressure regulator 4 to be moved in the direction so as to close the pressure compensating orifice until the pressure is balanced. Due to this, the flow rate of the fluid flowing through the variable throttle 2 is suppressed, thereby permitting the front-to-back differential pressure $\Delta P$ to be suppressed to the constant value corresponding to the set flow rate.

Due to the control of the secondary pilot pressure of the differential pressure regulator 4 due to the action of the sequence valve 38 responsive to the front-to-back differential pressure $\Delta P$ of the variable throttle 2 as mentioned above, the front-to-back differential pressure $\Delta P$ of the variable throttle 2 is always maintained to be constant. Thus, even if the inlet pressure $P_0$ or outlet pressure $P_2$ varies, it is possible to supply the fluid of the constant flow rate which was set by the variable throttle 2 to the cylinder load or the like.

In addition, the secondary pilot pressure of the differential pressure regulator 4 is controlled by the sequence valve 38 provided independently of the main oil passage 22, so that the pilot pressure is not influenced by a change in opening of the pressure compensating orifice of the differential pressure regulator 4. Therefore, there is no need to make the differential pressure setting spring 20 strong or increase the hydraulic acting area of the pressure compensating spool. As the differential pressure regulator 4, a regulator which is equal to or further smaller than the conventional regulator can be used.

Further, the setting of the rated flow rate corresponding to the maximum flow rate at which the front-to-back differential pressure $\Delta P$ of the variable throttle 2 can be made constant can be realized by increasing the spring load $F_1$ of the differential pressure setting spring 42 in the sequence valve 38 without using the differential pressure setting spring 20 of the differential pressure regulator 4. The fluid of the small flow rate $q_1$ due to the constant flow control valve 28 may be merely allowed to flow through the oil passage 36 in which the sequence valve 38 is provided. Thus, the sequence valve 38 itself can be miniaturized and even if the spring load $F_1$ of the differential pressure setting spring 42 is enlarged, there is no need to make the valve structure large. Also, even if the rated flow rate is increased, the control circuit can be designed so as to become small-sized.

The above-mentioned point can be also likewise applied to the constant flow control valve 28 provided in the oil passage 26 and the throttle 92 connected in parallel to the sequence valve 38. The fluid of the small flow rate $q_1$ based on the constant flow control valve 28 may be merely allowed to flow. Therefore, as the constant flow control valve 28 and throttle 92 as well, a small-sized valve 28 and throttle can be used. Consequently, even in the case where the constant flow control valve 28, sequence valve 38 and throttle 92 are newly arranged, the control circuit can be sufficiently miniaturized.

Furthermore, in the case where an increase in peak pressure on the load side does not cause a problem, the embodiment for the above-mentioned flow control circuit is useful since the structure can be simplified and miniaturized.

The variable throttle 2 and relief valve 48 have been described as the semifixed manual operating types. However, if they are constituted as the electromagnetic proportional types which are operated due to electrical signals, it is apparent that they can be operated at a high response speed by the electrical signals.

What is claimed is:

1. An apparatus for controlling a pressure and a flow rate comprising:
    a main passage having an upstream end and a downstream end for flow of fluid therein;

a variable throttle interposed in said main passage for adjusting a flow rate of fluid through said main passage, said variable throttle having an input port and an output port;

a differential pressure regulator interposed in said main passage in series with and upstream from said variable throttle, said differential pressure regulator having a primary pilot chamber in fluid communication with said input port of said variable throttle and a secondary pilot chamber with a differential pressure setting spring disposed within said secondary pilot chamber;

a constant flow control valve having an input port in fluid communication with said main passage upstream from said differential pressure regulator and an output port for fluid communication with said secondary pilot chamber of said differential pressure regulator, said constant flow control valve allowing fluid at a constant flow rate to pass through said output port thereof;

first fluid passage means connecting said output port of said constant flow control valve to said secondary pilot chamber of said differential pressure regulator;

second fluid passage means connecting said secondary pilot chamber of said differential pressure regulator to said main passage downstream from said output port of said variable throttle;

a sequence valve means, interposed in said second fluid passage means connecting said secondary pilot chamber of said differential pressure regulator to said main passage downstream of said variable throttle, for detecting front-to-back differential pressure of said variable throttle and for controlling the amount of fluid supplied from said constant flow control valve to said secondary pilot chamber of said differential pressure regulator due to a throttle operation of said sequence valve means in response to said front-to-back differential pressure of said variable throttle, whereby said front-to-back differential pressure is held to a constant value corresponding to a set flow rate of said variable throttle;

a tank for storage of fluid;

a third fluid passage means connecting said output port of said constant flow control valve to said tank;

a relief valve interposed in said third fluid passage means connecting said output port of said constant flow control valve to said tank, said relief valve being set to a predetermined relief pressure for allowing fluid to pass to said tank when pressure at said output port of said constant flow control valve exceeds said predetermined relief pressure;

fourth fluid passage means connecting said main passage downstream of said variable throttle to said relief valve; and a check valve interposed in said fourth fluid passage means connecting said main passage downstream of said variable throttle to said relief valve, said check valve being set to a predetermined pressure for allowing fluid to pass from said main passage downstream of said variable throttle to said relief valve when a predetermined differential pressure exists on either side of said check valve.

2. An apparatus for controlling a pressure and a flow rate comprising:

a main passage having an upstream end and a downstream end for flow of fluid therein;

a variable throttle interposed in said main passage for adjusting a flow rate of fluid through said main passage, said variable throttle having an input port and an output port;

a differential pressure regulator interposed in said main passage in series with and upstream from said variable throttle, said differential pressure regulator having a primary pilot chamber in fluid communication with said input Port of said variable throttle and a secondary pilot chamber with a differential pressure setting spring disposed within said secondary pilot chamber;

a constant flow control valve having an input port in fluid communication with said main passage upstream from said differential pressure regulator and an output port for fluid communication with said secondary pilot chamber of said differential pressure regulator, said constant flow control valve allowing fluid at a constant flow rate to pass through said output port thereof;

first fluid passage means connecting said output port of said constant flow control valve to said secondary pilot chamber of said differential pressure regulator;

a tank for storage of fluid;

second fluid passage means connecting said secondary pilot chamber of said differential pressure regulator to said tank;

a sequence valve means, interposed in said second fluid passage means connecting said secondary pilot chamber of said differential pressure regulator to said, for detecting front-to-back differential pressure of said variable throttle and for controlling the amount of fluid supplied from said constant flow control valve to said secondary pilot chamber of said differential pressure regulator due to a throttle operation of said sequence valve means in response to said front-tb-back differential pressure of said variable throttle, whereby said front-to-back differential pressure is held to a constant value corresponding to a set flow rate of said variable throttle;

a third fluid passage means connecting said output port of said constant flow control valve to said tank;

a relief valve interposed in said third fluid passage means connecting said output port of said constant flow control valve to said tank, said relief valve being set to a predetermined relief pressure for allowing fluid to pass to said tank when pressure at said output port of said constant flow control valve exceeds said predetermined relief pressure;

fourth fluid passage means connecting said main passage downstream of said variable throttle to said relief valve; and a check valve interposed in said fourth fluid passage means connecting said main passage downstream of said variable throttle to said relief valve, said check valve being set to a predetermined pressure for allowing fluid to pass from said main passage downstream of said variable throttle to said relief valve when a predetermined differential pressure exists on either side of said check valve.

* * * * *